United States Patent [19]
George

[11] Patent Number: 4,599,725
[45] Date of Patent: Jul. 8, 1986

[54] RAMAN LASER WITH CONTROLLABLE SUPPRESSION OF PARASITICS

[75] Inventor: E. Victor George, Livermore, Calif.

[73] Assignee: The United States of America as represented by the United States Department of Energy, Washington, D.C.

[21] Appl. No.: 473,178

[22] Filed: Mar. 8, 1983

[51] Int. Cl.$^4$ .............................................. H01S 3/00
[52] U.S. Cl. ........................................ 372/3; 307/426
[58] Field of Search ................ 372/3, 71, 70; 307/426

[56] References Cited
U.S. PATENT DOCUMENTS
3,515,897 6/1970 Culver ..................................... 372/3

FOREIGN PATENT DOCUMENTS
1222180 3/1965 Fed. Rep. of Germany ......... 372/3

Primary Examiner—William L. Sikes
Assistant Examiner—Robert E. Wise
Attorney, Agent, or Firm—John F. Schipper; Clifton E. Clouse, Jr.; Judson R. Hightower

[57] ABSTRACT

Method and apparatus for switching energy out of a Raman laser optical cavity. Coherent radiation at both the pump and first Stokes wave frequencies are introduced into the optical cavity from the same direction, and a second Stokes wave is utilized to switch the energy out of the cavity.

5 Claims, 3 Drawing Figures

RAMAN LASER WITH CONTROLLABLE SUPPRESSION OF PARASITICS

The U.S. Government has rights in this invention pursuant to Contract No. W-7405-ENG-48 between the U.S. Department of Energy and the University of California, for the operation of Lawrence Livermore National Laboratory.

FIELD OF THE INVENTION

This invention relates to laser systems for generating high intensity pulses using Raman cell energy conversion.

BACKGROUND OF THE INVENTION

A "Raman accumulator cell" is a closed container containing a Raman-active gas (e.g., $CH_4$, $H_2$ or $CS_2$) and having two parallel side walls that are substantially fully reflective (viewed from within the container) at two predetermined, adjacent frequencies $\nu_p$ and $\nu_s$ ($\lesssim \nu_p$) and having two opposing end walls that are substantially transparent at the frequencies $\nu_p$ and $\nu_s$ and at a third predetermined adjacent frequency $\nu_{2s}$ ($\lesssim \nu_s$).

Propagation of substantially monochromatic radiation of frequency, say $\nu = \nu_p$, in a Raman-active gas gives rise to stimulated Raman scattering at a series of frequencies $\nu = \nu_p \pm \nu_1$, $\nu_p \pm \nu_2 \ldots$ ($0 < \nu_1 < \nu_2 \ldots$), called Stokes frequencies, where the frequency shift $\{\Delta\nu\{ = \nu_1, \nu_2 \ldots$ are usually small fractions of the central (Rayleigh) frequency $\nu = \nu_p$ and manifest the effects of molecular vibrations of the Raman-active gas. Hydrogen gas ($H_2$, HD and $D_2$) and other low atomic weight molecular gases such as $CH_4$, $CS_2$, etc. have large vibrational shifts, but gases also having narrow line widths at the shifted frequencies are preferred for Raman scattering. The Raman scattered radiation can be a Stokes line ($\Delta\nu = -\nu_1, =\nu_2 \ldots$) or an anti-Stokes line ($\Delta\nu = \pm\nu_1, \pm\nu_2 \ldots$) depending upon whether the particular molecular vibration of the gas absorbs energy ($\Delta\nu < 0$) or gives up energy ($\Delta\nu > 0$) as the gas scatters the incident radiation.

Raman cell conversion of energy (from one frequency to another) is a useful means of generating high intensity laser radiation, since radiation energy can be temporarily stored in the medium through Raman pumping and extracted by a Stokes wave of shifted frequency for pump power density above a predetermined threshold.

One problem encountered here is the appearance of higher order Stokes waves of different frequencies that often act as parasitic waves, growing in intensity at the expense of the first Stokes wave.

SUMMARY OF THE INVENTION

The invention is a method and apparatus for Raman cell production of high intensity laser radiation, using the second Stokes wave for switching energy out of the cell.

Accordingly, an object of the invention is to provide a method and apparatus for efficiently switching energy out of a Raman cell.

Another object of the invention is to provide a method and apparatus for temporarily suppressing second Stokes waves in a Raman cell.

Still another object of the invention is to provide a method and apparatus for minimizing parasitic wave generation in a Raman cell.

Yet another object of the invention is to provide a method and apparatus for converting Raman cell energy to high intensity laser radiation.

Additional objects, advantages and novel features of the invention will be set forth in part in the description which follows and in part will become apparent to those skilled in the art upon examination of the following or may be learned by practice of the invention. The objects and advantages of the invention may be realized and attained by means of the instrumentalities and combinations particularly pointed out in the appended claims.

To achieve the foregoing objects in accordance with the invention, the method comprises the steps of providing a first amplifier cell containing a Raman pump medium, for generating radiation at a predetermined frequency $\nu_p$, and a second amplifier cell containing a first Stokes wave medium, for generating radiation at a second predetermined frequency $\nu_s$, with $\nu_s \lesssim \nu_p$. A Raman accumulator containing a Raman-active medium is included whose gain/loss curve manifests gain for propagation of radiation therethrough at the frequencies $\nu = \nu_p$ and $\nu = \nu_s$, and manifests substantial loss for radiation propagation at frequencies $\nu \leq \nu_{2s}$, where $\nu_{2s}$ is the second Stokes frequency corresponding to the pump frequency $\nu_p$. The Raman pump medium is excited to produce a radiation pump pulse with a narrowly defined frequency $\nu_p$, and the pump pulse is propagated through the Raman accumulator at least twice so as to convert substantially all energy contained in the pump pulse to energy stored in the Raman medium. The first Stokes wave medium is excited to produce a first Stokes wave with a narrowly defined frequency $\nu_s$ and is propagated through the Raman accumulator along substantially the same optical path as that taken by the pump pulse that precedes it, to absorb a portion of the energy stored in the Raman medium by passage therethrough of the pump pulse. A second Stokes wave of narrowly defined frequency $\nu_{2s}$ is provided and propagated at least twice through the Raman accumulator in direction(s) substantially opposite to the direction(s) of propagation of the first Stokes wave and in timed simultaneous relationship with the passages of the first Stokes wave through the Raman cell, whereby most of the energy contained in the first Stokes wave is converted to energy in the second Stokes wave and is extracted from the Raman accumulator.

The method and apparatus of the present invention uses one of the higher order Stokes waves generated through the Raman cell conversion of energy, the second Stokes wave, to switch the energy out of the Raman cell. In this regard, second Stokes waves generated in a Raman cell are temporarily suppressed and parasitic wave generation is minimized.

BRIEF DESCRIPTION OF THE DRAWINGS

The accompanying drawings, which are incorporated in and form a part of the specification, illustrate various embodiments of the invention and, together with the description, serve to explain the principles of the invention.

DETAILED DESCRIPTION OF THE PREFERRED EMBODIMENT

Figure 2:
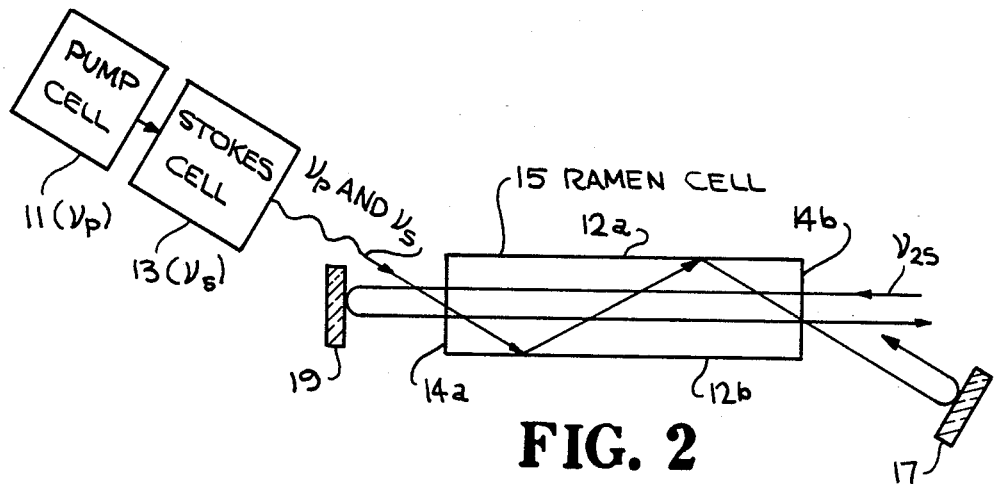
FIG. 2 is a schematic view of one embodiment of the invention, showing the pump cell and Stokes cell in substantially collinear relationship relative to the Raman accumulator.

Referring now to FIG. 2, "Raman accumulator cell" is a closed container containing a Raman-active gas (e.g., $CH_4$, $H_2$ or $CS_2$) and having two parallel side walls 12a and 12b (first and second end mirrors of the accumulator), respectively, that are both substantially fully reflective (viewed from within the container) at two predetermined, adjacent frequencies $\nu_p$ and $\nu_s$ ($\lesssim \nu_p$) and having two opposing end walls 14a and 14b that are substantially transparent at the frequencies $\nu_p$ and $\nu_s$ and at a third predetermined, adjacent frequency $\nu_{2s}$ ($\lesssim \nu_s$).

Apparatus for switching out radiant energy from a Raman or Brillouin medium contained in an optical cavity is described in U.S. patent application, Ser. No. 363,971 filing date Mar. 31, 1982, for "The Raman Accumulator as a Fusion Laser Driver" by the same inventor and others, assigned to the same assignee and incorporated herein by reference. The subject invention disclosed herein accomplishes this switchout by simpler means in that only one optical path and one optical cavity is required for the apparatus.

Figure 1:
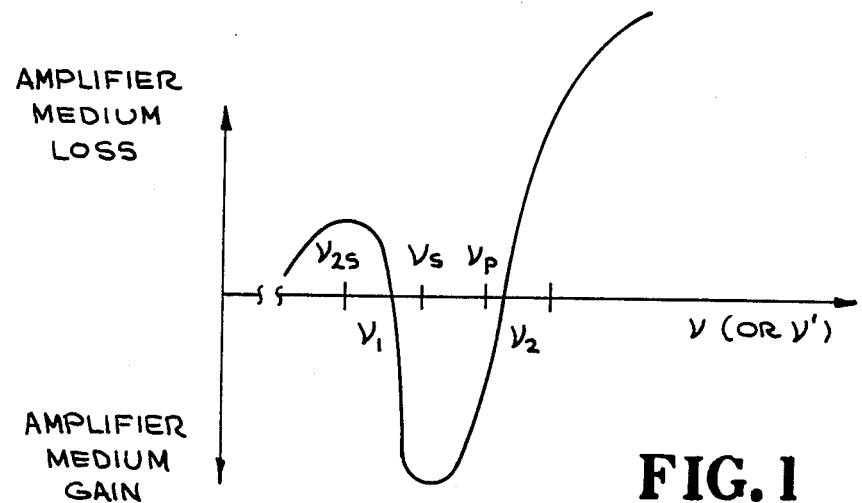
FIG. 1 is a graphic representation of the amplifier gain/loss curve, expressed as a function of frequency $\nu(\sec^{-1})$ or wave number $\nu'(cm^{-1})$, of a Raman-active medium suitable for use in the Raman cell of the subject invention.

FIG. 1 exhibits a gain/loss curve for a Raman-active scattering/amplification medium (e.g., $D_2$ or $CH_4$) as a function of frequency $\nu$ or wave number $\nu'(cm^{-1})$. In the gain region $\nu_1 < \nu < \nu_2$ of the curve (typically, $\nu_2' - \nu_1' \approx 300$ cm$^{-1}$), the medium manifests negative loss (gain); and by appropriate choice of a pump frequency $\nu_p$, both $\nu_p$ and the first Stokes wave frequency $\nu_s$ is placed within the gain region ($\nu_1 < \nu_s < \nu_p < \nu_2$) while the second Stokes wave frequency $\nu_{2s}$ lies outside the gain region so that a second Stokes wave is attenuated. With these choices, a seed pulse at $\nu = \nu_p$ or $\nu = \nu_s$, introduced into the optical cavity containing that medium, grows approximately exponentially until saturation.

The pump pulse ($\nu = \nu_p$) is generated by a first laser 11 (FIG. 2), introduced into a Raman accumulator cell 15 as shown, propagated through the cell, normally reflected by a substantially fully reflecting mirror 17 and returned through the cell 15 in the opposite direction. This pump pulse is depleted through extraction of energy by the Raman-active gas contained in the cell 15 so that the pump pulse is replenished by passage through the pump cell 11 for one or more additional round trips through the accumulator cell 15.

After sufficient energy has been transferred to the accumulator cell 15, amplification within the pump cell 11 is suppressed and an adjacent Stokes cell 13 is activated to produce a first Stokes wave of frequency $\nu_s$ that is propagated along substantially the same round trip optical path as the pump pulse path through the accumulator cell 15. Since both frequencies $\nu_p$ and $\nu_s$ lie in the gain region of the accumulator cell gaseous medium, both manifest strong gain in the cell 15.

As the first Stokes wave passes through the accumulator cell for at least two passages, once each in a first direction (left to right in FIG. 2) and the reverse direction, a second Stokes wave of frequency $\nu_{2s}$ is simultaneously passed through the cell 15 from right to left as shown and is reflected from the fully reflecting mirror 19 and returned through the accumulator cell in substantially the opposite direction (left to right) to the first pass of this wave. As the second Stokes wave passes through the accumulator cell 15 each time, it encounters and extracts substantially all energy from the counter-propagating first Stokes wave, which is passed through the accumulator cell from right to left. The amplified second Stokes wave then passes out of the accumulator cell toward the right, for use as a laser fusion driver or for other purposes. This apparatus and associated method uses a single accumulator cell 15 for two purposes, for pulse-first Stokes energy transfer and for first Stokes-second Stokes energy switchout.

The configuration of FIG. 2 illustrates positioning of a pump cell and a Stokes wave cell (non-simultaneously producing radiation at the respective frequencies $\nu_p$ and $\nu_s$) so that the two beams at frequencies $\nu_p$ and $\nu_s$ travel substantially the same optical path through the accumulator cell 15. One approach for accomplishing this is a triple cell combination relying on controllable total internal reflection, as disclosed in co-pending U.S. patent application U.S. Ser. No. 477,456, filed Mar. 21, 1983, by E. V. George et al. for a "Dual Frequency Optical Cavity", assigned to the same assignee as this application and incorporated herein by reference.

Figure 3:
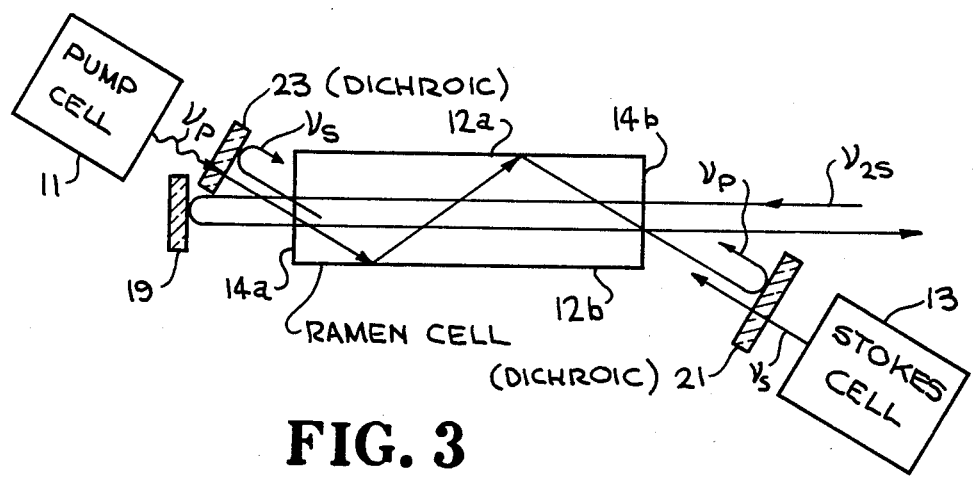
FIG. 3 is a schematic view of an alternative embodiment of the invention, with the pump cell and Stokes cell located at opposite ends of the Raman accumulator.

FIG. 3 exhibits an alternative embodiment of the invention, in which the pump pulse and Stokes wave are injected from different ends of the Raman accumulator cell 15 so as to travel substantially the same optical path. This requires the use of a dichroic reflector 21 that is substantially fully reflecting at a frequency $\nu_p$ but is partially transmitting at frequency $\nu_s$; and a second dichroic reflector 23 that is substantially a perfect reflector at frequency $\nu_s$ but is partially or fully transmitting at frequency $\nu_p$.

Although the Raman cell medium itself manifests loss at the frequency $\nu = \nu_{2s}$ (and at lower frequencies as well), the first Stokes wave (frequency $\nu_s$) itself, viewed as a "medium" in which the counter-propagating second Stokes wave (frequency $\nu_{2s}$) moves, manifests "gain" which is readily depleted by energy transfer to the second Stokes wave. Thus, growth of the second Stokes wave is controllably delayed until the first Stokes wave is sufficiently energetic to allow rapid amplification of the second Stokes wave.

The foregoing description of preferred embodiment of the invention has been presented for purposes of illustration and description. It is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

I claim:

1. A method for producing a high intensity laser pulse through Raman scattering, the method comprising the steps of:

providing a Raman accumulator having two end walls and containing a Raman-active gas that has an amplifier gain/loss curve that manifests gain at a first predetermined frequency $\nu_p$ and at an adjacent, second predetermined frequency $\nu_s$ ($\lesssim \nu_p$), where $\nu_s$ is the first Stokes wave frequency for the gas corresponding to pumping the gas at frequency $\nu_p$, and the gas manifests substantial loss at an adjacent, a third predetermined frequency $\nu_{2s}$ ($\lesssim \nu_s$), which is the second Stokes wave frequency for the gas;

propagating a radiation pump pulse of frequency $\nu_p$ from the first end of the accumulator to the second end and from the second end of the accumulator to the first end so as to convert substantially all energy contained in the pump pulse to energy stored in the Raman-active gas;

propagating a first Stokes wave radiation pulse of frequency $\nu_s$ at least twice through the Raman accumulator along substantially the same optical path as following by the pump pulse, in time relationship with and following passage of the pump pulse through the Raman accumulator so that the first Stokes wave absorbs substantially all the radiation energy stored in the Raman-active gas by the pump pulse;

propagating a second Stokes wave radiation pulse of frequency $\nu_{2s}$ through the Raman accumulator, simultaneously with at least two passages of the first Stokes wave through the accumulator, in directions generally opposite to the directions of propagation of the first Stokes wave through the accumulator, whereby substantially all radiation energy deposited by the pump pulse is converted to radiation energy of frequency $\nu_{2s}$ and is extracted from the accumulator.

2. The method for producing a high intensity laser pulse through Raman scattering according to claim 1 wherein the radiation pump pulse and the first Stokes wave are generated by a pump cell and a Stokes wave cell respectively, positioned at the same end of the Raman accumulator.

3. The method for producing a high intensity laser pulse through Raman scattering according to claim 1, wherein the radiation pump pulse and first Stokes wave are generated by a pump cell and a Stokes wave cell respectively, positioned at opposing ends of the Raman accumulator.

4. Apparatus for producing a high intensity Raman laser pulse, the apparatus comprising:

a Raman accumulator having first and second parallel side walls, which are substantially fully reflective at two predetermined, adjacent frequencies $\nu_p$ and $\nu_s$ ($\lesssim \nu_p$), and having first and second opposing end walls that are substantially transparent at frequencies $\nu_p$ and $\nu_s$ and at a third predetermined adjacent frequency $\nu_{2s}$ ($\lesssim \nu_s$) and containing a Raman-active gas with an amplifier gain/loss curve that manifests gain at frequency $\nu_p$ and at frequency $\nu_s$, where $\nu_s$ is the first Stokes wave frequency corresponding to a pump frequency of $\nu_p$ for the Raman-active gas, with the gas manifesting substantial loss at the frequency $\nu_{2s}$ ($\lesssim \nu_s$), which is the second Stokes wave frequency corresponding to a pump frequency $\nu_p$ for the Raman-active medium;

a pump cell, spaced apart from the accumulator and containing a medium capable of producing a highly directional, substantially monochromatic radiation pulse of frequency $\nu_p$ and positioned to direct such radiation through the first accumulator transparent end wall so that such radiation reflects at least once from the first highly reflective side wall of the accumulator and exits from the accumulator through the second transparent end wall of the accumulator;

a first mirror, positioned adjacent to the accumulator and substantially fully reflecting at frequencies $\nu_p$ and $\nu_s$, positioned adjacent to the accumulator to reflect the radiation pulse that issues from the accumulator through the second end wall back into and through the accumulator along substantially the same optical path that the pulse travelled on its first passage through the accumulator;

a Stokes cell, adjacent to the pump cell and spaced apart from the accumulator and containing a medium capable of producing a highly directional, substantially monochromatic radiation pulse of frequency $\nu_s$ and positioned to direct such radiation through the accumulator along substantially the same optical path as that followed by the pump pulse;

radiation source means, spaced apart from the accumulator, for producing a highly directional, substantially monochromatic radiation pulse of frequency $\nu_{2s}$, positioned to direct the pulse through the accumulator from one accumulator transparent end wall to the other transparent end wall in timed relationship with and in direction generally opposite to first passage of the first Stokes wave pulse through the accumulator; and a second mirror that is substantially fully reflecting for radiation at frequency $\nu_{2s}$, positioned adjacent to an accumulator end wall so as to reflect the second Stokes wave pulse after the pulse has passed through the accumulator once and to return the pulse through the accumulator a second time in timed simultaneous relationship with passage of the first Stokes wave pulse through the accumulator a second time.

5. Apparatus for producing a high intensity Raman laser pulse, the apparatus comprising:

a Raman accumulator having first and second parallel side walls, which are substantially fully reflective at two predetermined, adjacent frequencies $\nu_p$ and $\nu_s$ ($\lesssim \nu_p$), and having first and second opposing end walls that are substantially transparent at frequencies $\nu_p$ and $\nu_s$ and at a third adjacent predetermined frequency $\nu_{2s}$ ($\lesssim \nu_s$), and containing a Raman-active gas with an amplifier gain/loss curve that manifests gain at frequency $\nu_p$ and at frequency $\nu_s$ ($\lesssim \nu_p$), where $\nu_s$ is the first Stokes wave frequency corresponding to a pump frequency of $\nu_p$ for the Raman-active gas, and manifesting substantial loss at the frequency $\nu_{2s}$, which is the second Stokes wave frequency corresponding to a pump frequency $\nu_p$ for the Raman-active medium;

a pump cell spaced apart from the accumulator and positioned adjacent to the first accumulator end wall and containing a medium capable of producing a highly directional, substantially monochromatic radiation pulse of frequency $\nu_p$ and positioned to direct such radiation through a first accumulator transparent end wall so that such radiation reflects at least once from one of the highly reflective side walls of the accumulator and exits from the accumulator through a second transparent end wall of the accumulator;

a first dichroic reflector, substantially fully reflecting at frequency $\nu_p$ and partially transmissive at frequency $\nu_s$, positioned adjacent to the accumulator second end wall to reflect a radiation pulse of frequency $\nu_p$ that issues from the accumulator through the second end mirror of the accumulator back through the accumulator along substantially the same optical path that the pump pulse travelled on its first passage into and through the accumulator;

a Stokes cell, spaced apart from the accumulator and positioned adjacent to the first dichroic reflector, with the first dichroic reflector lying between the accumulator and Stokes cell, and containing a medium capable of producing a highly directional, substantially monochromatic radiation pulse of frequency $\nu_s$ and positioned to direct such radiation through the first dichroic reflector and through the accumulator along substantially the same optical path as that followed by the pump pulse;

a second dichroic reflector, positioned between the pump cell and the first end mirror of the accumulator and being substantially fully reflecting at frequency $\nu_s$ and partially transmissive at frequency $\nu_p$, positioned to reflect a radiation pulse of frequency $\nu_s$ that issues from the accumulator through the first accumulator end wall of the accumulator back into and through the accumulator along substantially the same optical path that the Stokes pulse travelled in its first passage through the accumulator;

radiation source means, spaced apart from the accumulator, for producing a highly directional, substantially monochromatic radiation pulse of frequency $\nu_{2s}$, positioned to direct the pulse through the accumulator from one end wall of the accumulator to the other end wall of the accumulator in timed relationship with and in a generally opposite direction to first passage of the first Stokes wave pulse through the accumulator; and a mirror that is substantially fully reflecting for radiation at frequency $\nu_{2s}$, positioned adjacent to an accumulator end wall so as to reflect the second Stokes wave pulse after the pulse has passed through the accumulator once and to return the pulse through the accumulator a second time in timed relationship with passage of the first Stokes wave pulse through the accumulator a second time.

* * * * *